United States Patent [19]
Patel

[11] Patent Number: 5,888,944
[45] Date of Patent: Mar. 30, 1999

[54] OIL-BASED DRILLING FLUID

[75] Inventor: Arvind D. Patel, Houston, Tex.

[73] Assignee: MI L.L.C., Houston, Tex.

[21] Appl. No.: 880,266

[22] Filed: Jun. 23, 1997

Related U.S. Application Data

[60] Provisional application Nos. 60/023,043 Aug. 2, 1996 and 60/047,543 May 23, 1997.

[51] Int. Cl.⁶ .............................. C09K 7/06; C09K 7/00
[52] U.S. Cl. ...................... 507/110; 507/127; 507/129; 507/131; 507/136; 507/138; 507/211; 507/234; 507/244; 507/260; 507/261; 507/265
[58] Field of Search .................................. 507/110, 127, 507/129, 131, 211, 234, 244, 136, 138, 260, 261, 265

[56] References Cited

U.S. PATENT DOCUMENTS

| | | | |
|---|---|---|---|
| 2,802,531 | 8/1957 | Cardwell et al. | 166/42 |
| 2,900,336 | 8/1959 | Brown et al. | 252/8.5 |
| 2,900,337 | 8/1959 | Earley et al. | 252/8.5 |
| 3,804,760 | 4/1974 | Darley | 507/129 |
| 3,962,151 | 6/1976 | Dekker et al. | 252/548 |
| 4,040,866 | 8/1977 | Mondshine | 134/26 |
| 4,230,586 | 10/1980 | Bretz et al. | 252/8.5 |
| 4,582,543 | 4/1986 | Bretz | 148/250 |
| 4,615,813 | 10/1986 | Bretz | 252/8.514 |
| 4,645,608 | 2/1987 | Rayborn | 252/8.51 |
| 4,670,550 | 6/1987 | Bleeker et al. | 536/114 |
| 4,735,731 | 4/1988 | Rose et al. | 252/8.51 |
| 5,156,686 | 10/1992 | Van Slyke | 134/26 |
| 5,189,012 | 2/1993 | Patel et al. | 507/103 |
| 5,254,531 | 10/1993 | Mueller et al. | 507/131 |
| 5,260,268 | 11/1993 | Forsberg et al. | 507/131 |
| 5,330,662 | 7/1994 | Jahnke et al. | 507/131 |
| 5,403,820 | 4/1995 | Walker | 507/110 |
| 5,620,946 | 4/1997 | Jahnke et al. | 507/131 |
| 5,634,984 | 6/1997 | Van Slyke | 134/40 |
| 5,710,110 | 1/1998 | Cooperman et al. | 507/131 |

FOREIGN PATENT DOCUMENTS

| | | | |
|---|---|---|---|
| 2068129 | 7/1992 | Canada | C09K 5/00 |
| 0137538A2 | 4/1985 | European Pat. Off. | C90K 7/06 |
| 0226250A2 | 6/1987 | European Pat. Off. | C08J 3/08 |
| 0271943 | 11/1987 | European Pat. Off. | |
| 0271943A2 | 6/1988 | European Pat. Off. | C09K 7/02 |
| 0382070A1 | 2/1989 | European Pat. Off. | C09K 7/06 |
| 0386636 | 3/1990 | European Pat. Off. | |
| 0382318 | 8/1990 | European Pat. Off. | B01F 17/16 |
| 2462436A | 2/1977 | Germany | C10M 3/30 |
| 3903784 | 6/1990 | Germany | |
| 2195685 | 4/1988 | United Kingdom | C09K 7/06 |
| WO87/02692 | 5/1987 | WIPO | C09K 7/00 |
| PCT/EP92/01290 | 12/1992 | WIPO | C09K 7/06 |
| WO93/16145 | 8/1993 | WIPO | C09K 7/06 |
| PCT/US94/08729 | 6/1995 | WIPO | B01F 17/00 |

OTHER PUBLICATIONS

Kirk–Othmer, "Encyclopedia of Chemical Technology", Third Edition, vol. 1, A to Alkanolamines, pp. 944–960, 1978.
"Fine and Functional Chemicals", Nitrogen Derivatives, AKZO General Catalog. Copyright 1990.
"Quanternary Ammonium Compounds", Fine and Functional Chemicals, AKZO Catalog. Copyright 1990.
Lexis Search Dated May, 1, 1997, Citation List, 4 pages.
Chemical Abstracts Search Dated Apr. 2, 1997, 35 pages.
STN International Search. Chemical Abstracts and World Patent Index. Dated Apr. 9, 1997, 41 pages.

*Primary Examiner*—Philip Tucker
*Attorney, Agent, or Firm*—Arnold White & Durkee

[57] ABSTRACT

A method of removing the filter cake formed from invert emulsion compositions including an oleaginous, a non-oleaginous and an acid sensitive surfactant in an oil and gas well are disclosed. The acid sensitive surfactant is selected so that the invert emulsion can be broken and residual filter cake solids made water-wet upon the addition of an acidic wash fluid to the well.

27 Claims, No Drawings

OIL-BASED DRILLING FLUID

This application claims priority of U.S. Provisional Application No. 60/023,043 filed Aug. 12, 1996 and U.S. Provisional Application, No. 60/047,543 filed May 23, 1997.

BACKGROUND OF THE INVENTION

Field of the Invention

The present invention relates to invert emulsion fluids utilized in the drilling, completion and workover of oil and gas wells.

Background

Many types of fluids have been used in the drilling of oil and gas wells. The selection of an oil-based drilling fluid, also known as oil-based mud, involves a careful balance of the both the good and bad characteristics of such fluids in a particular application, the type of well to be drilled and the characteristics of the oil or gas field in which the well is to be drilled. A surfactant capable of emulsifying incorporated water into the oil is an essential component of oil-based muds.

The primary benefits of selecting an oil-based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art.

An especially beneficial property of oil-based muds is their excellent lubrication qualities. These lubrication properties permit the drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based muds are used. In contrast oil-based muds provide a thin, slick filter cake which helps to prevent pipe sticking and thus the use of the oil based mud can be justified.

Despite the many benefits of utilizing oil-based muds, they have disadvantages. In general, the use of oil based drilling fluids and muds has high initial and operational costs. These costs can be significant depending on the depth of the hole to be drilled. However, often the higher costs can be justified if the oil based drilling fluid prevents the caving in or hole enlargement which can greatly increase drilling time and costs. Disposal of oil-coated cuttings is another primary concern, especially for off-shore or deep-water drilling operations. In these latter cases, the cuttings must be either washed clean of the oil with a detergent solution which also must be disposed of, or the cuttings must be shipped back to shore for disposal in an environmentally safe manner. Another consideration that must be taken into account are local governmental regulations that may restrict the use of oil based drilling fluids and muds for environmental reasons.

Oil-based muds often contain water, be it unintentionally added during the drilling process (i.e. seepage from penetrated formations or residual water in the hole), or intentionally added water to affect the properties of the drilling fluid or mud. In such water-in-oil type emulsions, also know as invert emulsions, a emulsifier is utilized that will stabilize the emulsion. In general, the invert emulsion may contain both water soluble and oil soluble emulsifying agents. Typical examples of emulsifiers include polyvalent metal soaps, fatty acids and fatty acid soaps, and other similar suitable compounds that should be known to one of skill in the art. The use of traditional emulsifiers and surfactants in invert drilling fluid systems can complicate the clean up process in open hole completion operations. Drilling fluids using traditional surfactant and emulsifier materials may require the use of solvents and other surfactant washes to penetrate the filter cake and reverse the wetability of the filter cake particles. That is to say the washing with detergents should convert the oil-wet solids of the filter cake into water-wet solids. Water-wet solids in the filter cake are necessary so that the subsequent acid wash can attack the particles of the mud cake and destroy or remove them prior to production. The productivity of a well is somewhat dependent on effectively and efficiently removing the filter cake while minimizing the potential of water blocking, plugging or otherwise damaging the natural flow channels of the formation. The problems of efficient well clean-up, stimulation, and completion are a significant issue in all wells, and especially in open-hole horizontal well completions.

A typical horizontal well completion process includes one or more of the following: drilling the horizontal section utilizing an oil-based drilling fluid; smoothing directional corrections with a hole opener; displacing the open hole section with an unused drill-in fluid to minimize solids exposed to the completion assembly; running the completion assembly into the horizontal well; displacing the drill-in fluid with a completion brine; washing the filter cake with solvents and surfactants to remove or wash away the oil-based drilling fluid; destroying the filter cake with an acid soak; and, commencing production. Extension of the time required to clean up the open hole well can result in wellbore instability and possible collapse. The collapse of a well is generally considered a bad occurrence because the well will then have to be redrilled or opened up if production from the formation is to occur. Thus the stability of the open-hole well limits the number of steps performed before commencing production. Thus there is a tradeoff between increased production due to a fully cleaned-up wellbore and the potential of well collapse due to instability.

In view of the above there exists an unmet need for an oil-based drilling fluid or mud emulsion that can easily be broken in the presence of the acid soak solution. Such a fluid would allow a decrease in the number of steps involved in removing the filter cake and cleaning up the well while minimizing the risk of well collapse. In addition such a fluid would allow for a more thorough and complete cleaning up of the well thus increasing the production of the well.

SUMMARY OF THE INVENTION

The present invention is generally directed to a method of utilizing a novel invert emulsion drilling mud useful in the drilling, completing or working over of a subterranean well in which the oil-wet solids in the invert emulsion drilling mud can be converted from the oil-wet type to water-wet type solids. In one particular embodiment of the present invention, a method of removing a filter cake from a wellbore includes drilling the wellbore with a novel invert emulsion drilling mud in which the emulsion can be converted from a water-in-oil type emulsion to an oil-in water type emulsion. The invert emulsion drilling mud includes an oleaginous fluid, a non-oleaginous fluid, an acid sensitive surfactant and oil-wet solids. The acid sensitive surfactant is selected so that upon addition of acid to the invert emulsion drilling mud, the invert emulsion is broken or converted into an oil-in-water type emulsion. The method further includes washing the filter cake with a washing fluid, the washing fluid including water, surfactant and an acid. The acid is selected so as to react with the acid sensitive surfactant in the filter cake so as to convert the oil-wet solids of the filter cake to water-wet solids. Thus, the filter cake solids may be removed from the wellbore by washing the wellbore with a fluid, preferably and aqueous fluid.

The oleaginous fluid may preferably be diesel oil, mineral oil, a synthetic oil and suitable combinations of these and/or may include a material selected from the group including esters, ethers, acetals, dialkylcarbonates, hydrocarbons and combinations thereof. The non-oleaginous fluid is preferably an aqueous liquid which may be selected from the group including sea water, brine containing organic and/or inorganic dissolved salts, an aqueous solution containing water-miscible organic compounds, or combinations of these. The acid sensitive surfactant is preferably selected from acid hydrolyzable mixed alkyldiethanol amides, alkyl glucoside, polyalkylglucosides, alkylalkoxypolydimethylsiloxanes, polyalkyldimethylsiloxanes or combinations thereof.

In another embodiment of the present invention, the invert emulsion drilling mud may contain a weighting agent, a bridging agent or both. Such weighting agents and/or bridging agents may be selected from the group including calcium carbonate, dolomite, siderite, barite, celestite, iron oxides, manganese oxides, ulexite, carnalite, and sodium chloride.

DESCRIPTION OF ILLUSTRATIVE EMBODIMENTS

The interfacial tension between an oleaginous fluid, for example oil, and a non-oleaginous fluid, for example water, is often high. Thus, if the liquids are mixed together they spontaneously separate from each other when the agitation ceases, to minimize the interfacial area. Lowering the interfacial tension with an emulsifier enables one liquid to form a stable dispersion of fine droplets in the other. The lower the interfacial tension, the smaller the droplets and the more stable the emulsion. In most emulsions, the oleaginous fluid is the dispersed phase and the non-oleaginous fluid is the continuous phase. However, "invert emulsions", in which the non-oleaginous fluid is the dispersed phase and the oleaginous fluid is the continuous phase, can be formed upon the use of suitable emulsifiers. One of skill in the art should appreciate that the chemical properties of the emulsifiers are important in the selection of a suitable emulsifier to form stable invert emulsions.

The present invention is generally directed to an invert emulsion fluid that is useful in the drilling, completing and working over of subterranean wells, preferably oil and gas wells. Such uses of invert emulsion fluids in such application should be known to one of skill in the art as is noted in the book *COMPOSITION AND PROPERTIES OF DRILLING AND COMPLETION FLUIDS, 5th Edition*, H. C. H. Darley and George R. Gray, Gulf Publishing Company, 1988, the contents of which are hereby incorporated herein by reference.

In one embodiment of the present invention, the invert emulsion drilling mud includes an oleaginous fluid, an non-oleaginous fluid, an acid sensitive surfactant and oil-wet solids. The surfactant component is selected so as to provide the unexpected and unobvious results substantially described herein. The surfactant should be functionally able to form a stable invert emulsion drilling mud in which the oleaginous liquid is the continuous phase and the non-oleaginous liquid is the dispersed phase. Further, upon addition of an acid, the oil-wet solids in the drilling mud become water-wet solids, the latter being more readily removed from the wellbore surfaces during clean-up or stimulation activities.

The oleaginous fluid utilized in the present invention is a liquid and more preferably is a natural or synthetic oil and more preferably the oleaginous fluid is selected from the group including diesel oil; mineral oil; a synthetic oil, such as polyolefins, polydiorganosiloxanes; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include be selected from the group including esters, ethers, acetals, dialkylcarbonates, hydrocarbons, and combinations thereof.

The non-oleaginous fluid used in the formulation of the invert emulsion fluid of the present invention is a liquid and preferably is an aqueous liquid. More preferably, the non-oleaginous liquid may be selected from the group including: sea water; a brine containing organic and/or inorganic dissolved salts; liquids containing water-miscible organic compounds; and, combinations thereof. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid.

The selection of an acid sensitive surfactant useful in the present invention is accomplished by combining an amount of the selected surfactant with portions of the oleaginous fluid and non-oleaginous fluid in a suitable container. The fluid is then vigorously agitated or sheared so as to intimately mix the two fluids. Upon stopping of the mixing, visual observation will determine if an emulsion has formed. An emulsion is considered stable if the oleaginous and the non-oleaginous fluids do not substantially separate after agitation. That is to say the emulsion will last for more than about 1 minute after the halting of the agitating or shearing motion that formed the emulsion. One test of whether or not an invert emulsion has formed is to take a small portion of the emulsion and place it in a container of the oleaginous fluid. If an invert emulsion is formed, the drop of emulsion will disperse in the oleaginous fluid. An alternative test is to measure the electrical stability of the resulting emulsion using an commonly available emulsion stability tester. Generally in such tests, the voltage applied across two electrodes is increased until the emulsion breaks and a surge of current flows between the two electrodes. The voltage required to break the emulsion is regarded in the art as a measure of the stability of the emulsion. Such tests of emulsion stability should be well known to one of skill in the art as is evidenced by described on page 166 of the book *COMPOSITION AND PROPERTIES OF DRILLING AND COMPLETION FLUIDS, 5th Edition*, H. C. H. Darley and George R. Gray, Gulf Publishing Company, 1988, the contents of which are hereby incorporated herein by reference.

By using the above selection criteria, acid sensitive surfactants useful in the formulating invert drilling muds useful in the present invention may be selected from acid hydrolyzable mixed alkyldiethanol amides, alkyl glucosides, polyalkylglucosides, alkylalkoxypolydimethylsiloxanes, polyalkyldimethylsiloxanes or combinations thereof. In one embodiment the acid sensitive surfactants is the reaction product of the reaction between a mixed alkyl carboxylic acid and diethanol amine, wherein the mixed alkyl acid has at least 40% by weight linoleic acid. Preferably the mixed alkyl acid has less than 35% by weight of oleic acid. In another embodiment, the acid sensitive surfactant is the reaction product of the transamidification reaction between diethanol amine and an alkyl carboxylic acid ester. The ester may be a simple ester, such as a methyl or ethyl ester of the alkyl carboxylic acid ester or it may be a naturally occurring ester, such as a triglyceride. Preferably, soya oil, sunflower oil, corn oil, safflower oil or combinations thereof are utilized as the ester reactant in the transamidification reaction. It is preferred that the emulsifier be the reaction product of a 1:1 molar ratio of the fatty acid or fatty ester and amine.

One of skill in the art should understand that the reaction product of the above noted transamidification reaction that occurs between mixed alkyl carboxylic acid esters and diethanol amine may result in a surfactant product that is a complex mixture. That is to say, the resulting reaction product may be a mixture of compounds including amides, amines, alkyl acids, and other side products. The transamidification reaction of alkyl and mixed alkyl carboxylic acid esters with diethanol amine should be well known to one of skill in the art. It will be routine for one of skill in the art to react the acid ester with the amine, either under room temperature or heated conditions, extract the product and test the resulting reaction product as noted above for the selection of a suitable surfactant. Further, such transamidification products are readily available from commercial sources.

The amount of acid sensitive surfactant present in the invert emulsion fluid of the present invention, as noted above, should be sufficient to stabilize the invert emulsion according to the above noted test. That is to say the emulsion will last for more than about 1 minute after the halting of the agitation or shearing motion that forms the emulsion. While the concentration may vary depending on the particular components in the drilling fluid or mud, typically the concentration of the acid sensitive surfactant is less than about 10% by weight of the fluid. Thus in one embodiment the acid sensitive surfactant is preferably present in the invert emulsion drilling mud at a concentration of 0.1% to 5.0% by weight. More preferably the amount of acid sensitive surfactant present should be present in a concentration of 1 to 5% by weight of the fluid.

The acid utilized to break the invert emulsions of the present invention must be chemically capable of reacting with the acid sensitive surfactant so as to destroy the ability of the surfactant to stabilize the invert emulsion. Preferably, the acid should be of sufficient strength to hydrolyze the acid sensitive surfactant so as to break the invert emulsion. In one embodiment this amount is greater than about 1 equivalent of acid and preferably is about 1 to about 5 equivalents. Compounds that are suitable for use as an acid include, mineral acids and organic acids preferably soluble in water. Preferred mineral acids include hydrochloric acid, sulfuric acid, nitric acid, phosphoric acid, hydrofluoric acid, hydrobromic acid and the like. Preferred organic acids include citric acid, tartaric acid, acetic acid, propionic acid, glycolic acid, lactic acid, halogenated acetic acids, butyric acid, organosulfonic acids, organophosphoric acids, and the like. Compounds that generate acid upon dissolution in water may also be used, for example, acetic anhydride, hydrolyzable esters, hydrolyzable organosulfonic acid derivatives, hydrolyzable organophosphoric acid derivatives, phosphorus trihalide, phosphorous oxyhalide, anhydrous metal halides, sulfur dioxide, nitrogen oxides, carbon dioxide, and similar such compounds. Typically, fatty acids should be avoided or used in small amounts so as to not interfere with the reversibility of the acid sensitive surfactant system of this invention.

In yet another embodiment of the present invention, other surfactant compounds may be used in conjunction with the acid sensitive surfactants utilized herein. In such cases it is important however that the quantity and nature of these supplemental surfactants not prevent or seriously interfere with the breaking of the invert emulsion when acid is added.

The methods used in preparing the invert drilling muds of the present invention are not critical. Conventional methods can be used to prepare the drilling fluids of the present invention in a manner analogous to those normally used, to prepare conventional oil-based drilling fluids. In one representative procedure, a desired quantity of oleaginous fluid such as a base oil and a suitable amount of acid sensitive emulsifier are mixed together and the remaining components are added sequentially with continuous mixing. An invert emulsion of the present invention is formed by vigorously agitating, mixing or shearing the oleaginous fluid and the non-oleaginous fluid.

The invert drilling muds utilized in the present invention further include oil-wet solids and optionally other additional chemicals depending upon the end use of the invert emulsion so long as they do not interfere with the reversibility of the invert emulsion fluids described herein. For example, wetting agents, organophilic clays, viscosifiers, weighting agents, bridging agents and fluid loss control agents may be added to the fluid compositions of this invention for additional functional properties. The addition of such agents should be well known to one of skill in the art of formulating drilling fluids and muds. However, it should be noted that the addition of such agents should not adversely interfere with the properties imparted by the acid sensitive surfactant as described herein.

Wetting agents that may be suitable for use in this invention include, crude tall oil, oxidized crude tall oil, organic phosphate esters, modified Imidazolines and amidoamines, alkyl aromatic sulfates and sulfonates, and the like, and combinations or derivatives of these. However, the use of fatty acid wetting agents should be minimized so as to not adversely affect the breakability of the invert emulsion disclosed herein. VERSAWET® and VERSAWET®NS are examples of commercially available wetting agents manufactured and distributed by M-I Drilling Fluids L.L.C. that may be used in this invention. Silwet L-77, L-7001, L7605 and L-7622 are examples of commercially available surfactants and wetting agents manufactured and distributed by Union Carbide Chemical Company Inc.

Organophilic clays, normally amine treated clays, may be useful as viscosifiers in the fluid compositions of the present invention. Other viscosifiers, such as oil soluble polymers, polyamide resins, polycarboxylic acids and soaps can also be used. The amount of viscosifier used in the composition can vary depending upon the end use of the composition. However, normally about 0.1% to 6% by weight range are sufficient for most applications. VG-69™ and VG-PLUS™ are organoclay materials distributed by M-I Drilling Fluids L.L.C., and VERSA-HRP™ is a polyamide resin material manufactured and distributed by M-I Drilling Fluids L.L.C., that may be used in this invention.

Weighting agents or density materials suitable for use in this invention include, hematite, magnetite, iron oxides, magnesium oxides, illmenite, barite, siderite, celestite, dolomite, calcite, halite, and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

Fluid loss control agents typically act by coating the walls of the borehole as the well is being drilled. Suitable fluid loss control agents which may find utility in this invention include modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% and preferably less than about 5% by weight of the fluid.

As the term is used herein, the term "oil-wet solids" is to mean any particulate solid that is either intentionally or unintentionally a component of the invert drilling mud. A simple test to determine if a mass of particles is oil-wet or water-wet is as follows: A small portion of the solids are clumped together to form a small ball or mass. This small ball or mass is carefully dropped into a container holding water or some other aqueous fluid such as brine, sea water, or the like. If the clump or small ball of solid particles readily breaks apart and disperses, the solids are considered to be water-wet. If however the clump or small ball sink and form a reasonably consolidated mass on the bottom of the container, the solids are considered to be oil-wet. Another test is to place a small portion of the wet solids in the bottom of a test tube. If upon the addition of water followed by agitation the mass at the bottom of the tube is readily suspended in the water, the solids are considered to be water-wet. If however, the mass of particles are difficult to break apart or to suspend upon agitation, the solids are considered to be oil-wet. A similar test may be conducted utilizing a clear oil in place of the water. In such a case the water-wet solids will be difficult to suspend and the oil-wet solids will readily break-up and become suspended in the oil.

Examples of oil-wet solids in an invert emulsion drilling mud include clays, weighting materials, bridging materials, drilling solids made during the course of drilling, and other similar particular solids that may be present in the drilling mud. One of ordinary skill in the art should know that the solids contained in the drilling mud form the filter cake about the periphery of the wellbore during the drilling of the well. Thus, when a oil-based drilling mud is utilized to drill a well, the solids that make up the filter cake are oil-wet.

Thus in view of the above, one embodiment of the present invention is a method of removing a filter cake from a wellbore which includes drilling the wellbore utilizing an invert emulsion drilling mud as is described herein, such a drilling mud may include an oleaginous fluid, a non-oleaginous fluid, an acid sensitive surfactant and oil-wet solids. The acid sensitive surfactant is selected so that upon addition of acid the invert emulsion is broken or inverted to a oil-in-water type emulsion. Preferably the acid sensitive surfactant is selected from acid hydrolyzable mixed alkyldiethanol amides, alkyl glucosides, polyalkylglucosides, alkylalkoxypolydimethylsiloxanes, alkylpolydimethylsiloxanes or combinations thereof. More preferably the acid sensitive surfactant is the reaction product of a mixed alkyl acid ester having at least 40% by weight linoleic acid, and diethanol amine. More preferably the mixed alkyl acid has less that 35% by weight oleic acid. More preferably the acid sensitive surfactant is the transamidification reaction product of a mixed alkyl acid having at least 40% by weight linoleic acid and less than 35% by weight oleic acid, and diethanol amine. In a related embodiment the acid sensitive surfactant is a reaction product of the transamidification reaction of diethanol amine and soya oil, sunflower oil, corn oil, safflower oil and combinations thereof. In a third embodiment, the acid sensitive surfactant is selected from the group of surfactants including soyadiethanol amide and similar mixtures of $C_{12}$–$C_{22}$ alkyl diethanolamides, $C_{20}$–$C_{24}$ alkyl glucosides, $C_{20}$–$C_{24}$ polyalkyl glucosides, alkylalkoxypolydimethylsiloxanes, polyalkyldimethylsiloxanes or combinations thereof.

The method further includes washing the filter cake with a washing fluid which includes water, and an acid. The acid is selected so that it will react with the acid sensitive surfactant and convert the oil-wet solids of the filter cake to water-wet solids. Optionally the washing fluid may include a surfactant, provided that the surfactant is selected so that it compatible and non-reactive with the acid, the oleaginous fluid and the acid sensitive surfactant. In addition the surfactant should not interfere with the conversion or breaking of the oil-wet solids to water-wet solids. The method also includes removing of the filter cake from the wellbore by washing the wellbore with fluid. Preferably the fluid is a aqueous fluid and more preferably the fluid is a brine, sea water, water containing soluble inorganic or organic salts, and the like.

The oleaginous fluid utilized in the above method may comprise from about 30% to about 99% by volume of the invert drilling mud. Preferably it is selected from diesel oil, mineral oil a synthetic oil or combinations thereof. In one embodiment the oleaginous fluid comprises from about 5% to about 100% by volume of a material selected from esters, ethers, acetals, dialkylcarbonates, hydrocarbons, and combinations thereof. The non-oleaginous fluid may comprise from about 1% to about 70% by volume of the invert drilling mud. Preferably the non-oleaginous fluid is selected from sea water, brine containing organic and/or inorganic dissolved salts, an aqueous solution containing water soluble organic compounds or combinations thereof.

In another embodiment of the present inventive method, the cleaning-up of a wellbore drilled with an invert emulsion drilling mud is carried out. The method includes formulating the invert emulsion drilling mud so that the drilling mud includes an oleaginous fluid, a non-oleaginous fluid, an acid sensitive surfactant and oil wet solids. The acid sensitive surfactant is selected so that upon addition of acid to the invert emulsion, the invert emulsion is broken. That is to say, the water-in-oil type emulsion first formed is broken and/or converted to an oil-in-water type emulsion. The filter cake in the wellbore is then washed with a first washing fluid which includes an oleaginous fluid and surfactant. The first washing fluid is flushed through the wellbore in sufficient quantities to substantially remove the invert emulsion drilling mud from the wellbore. The method further includes washing the filter cake with a second washing fluid. This second washing fluid includes water, soap and an acid. The acid is selected so as to react with the acid sensitive surfactant thus converting the oil-wet solids of the filter cake to water-wet solids. The filter cake is removed from the wellbore by washing the wellbore with an aqueous fluid, which may be either the second washing fluid or brine or some other suitable fluid.

As described above, the acid sensitive surfactant is selected so that it can form a stable invert emulsion, but upon addition of acid to the invert emulsion drilling mud the water-in-oil type emulsion is broken and/or converted to a oil-in-water type emulsion. That is to say, upon the addition of acid the oil-wet solids of the filter cake formed at the periphery of the wellbore are converted into water-wet solids. Preferably the acid sensitive surfactant is selected from acid hydrolyzable mixed alkyldiethanol amides, alkyl glucosides, polyalkylglucosides, alkylalkoxypolydimethylsiloxanes, alkylpolydimethylsiloxanes or combinations thereof. More preferably the acid sensitive surfactant is the reaction product of a mixed alkyl acid having at least 40% by weight linoleic acid, and diethanol amine. More preferably the mixed alkyl acid has less that 35% by weight oleic acid. More preferably the acid sensitive surfactant is the transamidification reaction product of a mixed alkyl acid ester having at least 40% by weight linoleic acid and less than 35% by weight oleic acid, and diethanol amine. In a related embodiment the acid sensitive surfactant is a reaction product of the transarnidification reaction of diethanol amine and soya oil, sunflower oil, corn oil, safflower oil and combinations thereof. In a third embodiment the acid sensitive surfactant is selected from the group of surfactants including soyadiethanol amide and similar mixtures of $C_{12}$–$C_{22}$ alkyl diethanolamides, $C_{20}$–$C_{24}$ alkyl glucosides, $C_{20}$–$C_{24}$ polyalkyl glucosides, alkylalkoxypolydimethylsiloxanes, polyalkyldimethylsiloxanes or combinations thereof.

The oleaginous fluid utilized in the above method may comprise from about 30% to about 99% by volume of the invert drilling mud. Preferably it is selected from diesel oil, mineral oil a synthetic oil or combinations thereof. In one embodiment the oleaginous fluid comprises from about 5% to about 100% by volume of a material selected from esters, ethers, acetals, dialkylcarbonates, hydrocarbons, and combinations thereof. The non-oleaginous fluid may comprise from about 1% to about 70% by volume of the invert drilling mud. Preferably the non-oleaginous fluid is selected from sea water, brine containing organic and/or inorganic dissolved salts, an aqueous solution containing water soluble organic compounds or combinations thereof.

The present invention further includes the compositions disclosed herein. Thus, a drilling fluid composition of the present invention includes an oleaginous fluid, a non-oleaginous fluid, and acid sensitive surfactant and oil wet solids. The acid sensitive surfactant is preferably the transamidification reaction product of diethanol amine and a mixed alkyl carboxylic acid ester containing at least 40% by weight of linoleic acid. Preferably, the mixed alkyl acid ester is selected from soya oil, sunflower oil, corn oil, safflower oil and mixtures thereof. As previously noted above, the selection of the surfactant can be carried out utilizing the tests set forth above.

The following examples are included to demonstrate preferred embodiments of the invention. It should be appreciated by those of ordinary skill in the art that the techniques and compositions disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

General Information Relevant to the Examples

These tests were conducted in accordance with the procedures in API Bulletin RP 13B-2, 1990. The following abbreviations are used in describing the results of experimentation.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"AV" is apparent viscosity which is another variable used in the calculation of viscosity characteristic of drilling fluid, measured in centipoise (cp) units.

"GELS" is a measure of the suspending characteristics, or the thixotripic properties of a drilling fluid, measured in pounds per 100 square feet (lb/100 ft$^2$).

"API F.L." is the term used for API filtrate loss in milliliters (ml).

"HTHP" is the term used for high temperature high pressure fluid loss, measured in milliliters (ml) according to API bulletin RP 13 B-2, 1990.

EXAMPLE 1

Formulation 1

The following formulation was used as an acid based clean-up solution for breaking the invert emulsion drilling fluid of this invention.

| Material | Grams |
| --- | --- |
| Concentrated HCl | 35 |
| Water | 35 |
| Propylene glycol propyl ether | 15 |
| Monateric CEM-38 | 15 |

In the above formulation table, Monateric CEM-38 is a surfactant available from Mona Chemicals and all other materials are commonly available from commercial sources.

Formulation 2

The following formulation was used as a solvent based clean-up solution for solvent wash prior to acid clean-up for breaking the invert emulsion drilling fluids of this invention.

| Material | Grams |
| --- | --- |
| IO $C_{16}$–$C_{18}$ | 80 |
| Propylene glycol propyl ether | 10 |
| NP-60 | 10 |

In the above formulation table IO $C_{16}$–$C_{18}$ is an isomerized olefin available from Amoco Chemicals; NP-60 is a six ethoxylated nonylphenol from Witco Chemicals; and all other materials are commonly available from commercial sources.

The following drilling mud formulations were prepared to demonstrate the utility of acid-sensitive surfactants of this invention in acid clean-up process.

| Materials | Formulation 3 | Formulation 4 |
| --- | --- | --- |
| IO $C_{16}$–$C_{18}$ | 125 | 125 |
| VG PLUS ™ | 2.0 | 2.0 |
| Lime | 5.0 | 5.0 |
| NOVAMUL ™ | 10.0 | |
| Monamide 150 ADY | | 10 |

-continued

| Materials | Formulation 3 | Formulation 4 |
|---|---|---|
| 25% $CaCl_2$ Brine | 90 | 90 |
| $CaCO_3$ (fine) | 293 | 293 |

In the above formulation table IO $C_{16}$–$C_{18}$ is an isomerized olefin available from Amoco Chemicals; VG PLUS™ is an organoclay available from M-I Drilling fluids; NOVA-MUL™ is a surfactant available from M-I Drilling Fluids; Monamide 150 ADY is a surfactant available from Mona Chemicals; and all other materials are commonly available from commercial sources.

The above formulations were mixed according to the following general procedure.

(1) Mix IO $C_{16}$–$C_{18}$, VG PLUS™ and lime in a glass jar and stir for 10 minutes on a Hamilton Beach mixer.
(2) Add surfactants and mix for 10 minutes.
(3) Add calcium chloride brine and mix for 15 minutes.
(4) Add $CaCO_3$ and mix for 20 minutes.
(5) The above formulations were mixed at 8000 RPM for 10 minutes on a Silverson mixer.

The following rheologies were measured at 150° F. after heat aging at 175° F. for 16 hours.

|  | Formulation 3 | Formulation 4 |
|---|---|---|
| ES | 957 | 727 |
| PV | 36 | 30 |
| YP | 33 | 10 |
| Gels |  |  |
| 10 sec. | 15 | 5 |
| 10 min. | 17 | 7 |

The above formulations were treated with 25.0 ml of acid based Formulation 1. The invert emulsion of mud Formulation 4 was broken and the E.S. dropped to 7. The $CaCO_3$ was water-wet and was dispersible in water. In contrast, the invert emulsion of mud Formulation 3 was not completely broken and $CaCO_3$ solids remained oil-wet and did not disperse in water.

In a second experiment, mud Formulation 4 was first treated with an equal volume of Formulation 2 solvent. The $CaCO_3$ solids were separated and treated with 15 ml Formulation 1 solvent. Upon completion of this treatment, the $CaCO_3$ solids were completely water-wet and readily dissolved in a 10% hydrochloric acid solution.

EXAMPLE 2

To demonstrate the utility of drilling muds containing acid sensitive invert emulsifiers disclosed herein the following experiments were carried out in which the drilling mud was contaminated with common contaminating agents encountered in a drilling operation.

Aliquots of the drilling muds described above in Example 1 were contaminated as described below. Specifically Formulation 3 was used as an example of a conventional drilling fluid (i.e. a control) whose relevant characteristics were compared with Formulation 4, a drilling mud which is an exemplary embodiment of this invention. All the fluids were heat aged at 175° F. for 16 hours after contamination. The Theological properties were measured at 150° F.

The following characteristics were observed after contamination with 10% sea-water by volume.

|  | Formulation 3 (w/sea water) | Formulation 4 (w/sea water) |
|---|---|---|
| ES | 384 | 257 |
| PV | 41 | 38 |
| YP | 33 | 59 |
| Gels |  |  |
| 10 sec. | 15 | 25 |
| 10 min. | 16 | 27 |

The following characteristics were observed after contamination with 10 grams green cement.

|  | Formulation 3 (w/green cement) | Formulation 4 (w/green cement) |
|---|---|---|
| ES | 978 | 592 |
| PV | 37 | 31 |
| YP | 35 | 13 |
| Gels |  |  |
| 10 sec. | 16 | 6 |
| 10 min. | 17 | 7 |

The following characteristics were observed after contamination with 25 grams Rev. Dust, a particulate material commonly utilized to simulate drill cuttings.

|  | Formulation 3 (w/Rev Dust) | Formulation 4 (w/Rev Dust) |
|---|---|---|
| ES | 1054 | 770 |
| PV | 55 | 55 |
| YP | 56 | 67 |
| Gels |  |  |
| 10 sec. | 26 | 39 |
| 10 min. | 29 | 41 |

The following characteristics were observed after contamination with 10% volume of Zechstein brine.

|  | Formulation 3 (w/brine) | Formulation 4 (w/brine) |
|---|---|---|
| ES | 402 | 521 |
| PV | 41 | 31 |
| YP | 39 | 34 |
| Gels |  |  |
| 10 sec. | 13 | 15 |
| 10 min. | 16 | 16 |

One of ordinary skill in the art of drilling fluids should readily recognize, given the above data, that drilling muds made in accordance with the present invention are comparable to drilling muds made using conventional surfactant packages. However, it should also be recognized that the invert emulsion drilling muds of the present invention are readily breakable upon the addition of acid, which is a property not previously found in conventional invert emulsion drilling muds.

EXAMPLE 3

The following mud formulations were prepared to demonstrate the utility of acid sensitive emulsifiers of this invention in combination with other surfactants.

| Materials | Formulation 5 | Formulation 6 |
|---|---|---|
| IO $C_{16}$–$C_{18}$ | 125.2 | 125.2 |
| Lime | 2.0 | 4.0 |
| VG PLUS ™ | 4.0 | 5.0 |
| Monamide 150 ADY | 10.0 | 8.0 |
| Versa-Wet ™ | 1.0 | |
| O.S.-118665a | | 6 |
| 25% $CaCl_2$ Brine | 90 | 29.0 |
| $CaCO_3$ (fine) | 293 | 321.96 |

In the above formulation table, the abbreviations for materials are the same as those used above in Example 1, except that Versa-Wet™ is a surfactant available from M-I Drilling Fluids; O.S.-118665a is a surfactant available from Lubrizol; and all other materials are commonly available from commercial sources.

The above mud formulations were mixed according to general procedure described above in Example 1 and subsequently heat aged at 200° F. for 16 hours. The following rheological properties were measured at 150° F.

| | Formulation 5 | Formulation 6 |
|---|---|---|
| ES | 978 | 1809 |
| PV | 30 | 25 |
| YP | 31 | 9 |
| Gels | | |
| 10 sec. | 13 | 5 |
| 10 min. | 13 | 6 |
| HTHP/200° F. | 2.0 | 5.8 |

Each of the above mud formulations was treated with 35.0 ml of acid based Formulation 1. In both cases the previously oil-wet solids were converted to water-wet solids which were dispersible in water.

EXAMPLE 4

The following mud formulations were prepared using an acid sensitive surfactant of this invention to demonstrate the temperature stability of the resulting drilling mud.

| Formulation 7 | |
|---|---|
| Materials | Grams |
| IO $C_{16}$–$C_{18}$ | 128 |
| VG PLUS ™ | 4.0 |
| Lime | 4.0 |
| Monamide 150 ADY | 10.0 |
| NovaWet ™ | 2.0 |
| 25% $CaCl_2$ Brine | 87.0 |
| $CaCO_3$ (fine) | 293.0 |

In the above formulation table, the abbreviations for materials are the same as those used above in Example 1, except that NOVA-WET is a surfactant available from M-I Drilling Fluids; and all other materials are commonly available from commercial sources.

The above formulation was mixed according to general procedure described in Example 1. The initial and heat aged rheologies were measured at 150° F. The Formulation 7 mud was heat aged at 205° F. for 24 hours and 48 hours. The following table gives the characteristics after each heat aging period.

| | Initial | After 24 hours @ 205° F. | After 48 hours @ 205° F. |
|---|---|---|---|
| ES | 100 | 300 | 240 |
| PV | 35 | 31 | 34 |
| YP | 19 | 11 | 12 |
| Gels | | | |
| 10 sec. | 6 | 4 | 3 |
| 10 min. | 7 | 5 | 4 |

Given the above data, one of skill in the art should recognize that the invert emulsion drilling muds of the present invention can withstand temperatures typically encountered in drilling operations.

EXAMPLE 5

The following mud formulation was mixed to demonstrate the utility of acid sensitive surfactants of this invention in acid wash clean-up procedure.

| Formulation 8 | |
|---|---|
| Materials | Grams |
| IO $C_{16}$–$C_{18}$ | 158 |
| VG PLUS ™ | 5.0 |
| Lime | 4.0 |
| Monamide 150 ADY | 12.0 |
| Nova Wet ™ | 1.5 |
| 25% $CaCl_2$ Brine | 29 |
| $CaCO_3$ | 321.96 |

In the above formulation table, the abbreviations for materials are the same as those used in previous examples.

The above mud formulation was prepared according to the procedure given in Example 1. The mud was heat aged at 200° F./16 hours. Initial and heat aged rheological properties were measured at 150° F. In another experiment the above mud formulation was contaminated with 25 g. of Rev Dust, and heat aged at 200° F. for 16 hours. The result of both experiments are given below.

| | Initial | After 16 hrs. @ 200° F. | After 16 Hrs. @ 200° F. (w/Rev Dust) |
|---|---|---|---|
| ES | 337 | 957 | 1073 |
| PV | 21 | 21 | 33 |
| YP | 10 | 12 | 30 |
| Gels | | | |
| 10 sec. | 4 | 5 | 16 |
| 10 min. | 5 | 6 | 18 |
| H.T.H.P. at 200° F. | 25.0 | 3.6 | 41.6 |

The oil-wet filter cakes obtained from HTHP filtrate loss in above muds were first washed with 25 ml. of solvent based Formulation 2. The filter cakes were then soaked in acid based clean-up Formulation 1. The previously oil-wet filter-cake solids were found to be water-wet and immediately dissolved in acid solution. There were no oil-wet solids observed in the acid wash.

While the compositions and methods of this invention have been described in terms of preferred embodiments, it will be apparent to those of skill in the art that variations may be applied to the process described herein without departing from the concept, spirit and scope of the invention. All such similar substitutes and modifications apparent to those skilled in the art are deemed to be within the spirit, scope and concept of the invention as it is set out in the following claims.

What is claimed is:

1. A method of removing a filter cake from a wellbore, the method comprising:

drilling the wellbore utilizing an invert emulsion drilling mud, said invert emulsion drilling mud including an oleaginous fluid, a non-oleaginous fluid, an acid sensitive surfactant, and oil-wet solids, said acid sensitive surfactant being selected so that upon addition of acid the invert emulsion is broken;

washing the filter cake with a washing fluid, said washing fluid including water, and an acid, said acid having been selected so as to react with the acid sensitive surfactant so as to make the oil-wet solids of the filter cake water-wet, and;

removing the filter cake from the wellbore by washing the wellbore with fluid.

2. The method of claim 1 wherein the acid sensitive surfactant is selected from acid hydrolyzable, mixed alkyldiethanol amides, alkyl glucosides, polyalkylglucosides, alkylalkoxypolydimethylsiloxanes, polyalkyldimethylsiloxanes or combinations thereof.

3. The method of claim 2 wherein the acid sensitive surfactant is the reaction product of a mixed alkyl acid and diethanol amine, said mixed alkyl acid having at least 40% by weight of linoleic acid.

4. The method of claim 2 wherein the acid sensitive surfactant is the reaction product of a mixed alkyl acid and diethanol amine, said mixed alkyl acid having at least 40% by weight linoleic acid and less than 35% by weight of oleic acid.

5. The method of claim 2 wherein the acid sensitive surfactant is a reaction product of the transamidification of a mixed alkyl acid ester and diethanol amine, said mixed alkyl acid ester having at least 40% by weight linoleic acid and less than 35% by weight of oleic acid.

6. The method of claim 2 wherein the acid sensitive surfactant is a reaction product of the transamidification of diethanol amine and soya oil, sunflower oil, corn oil, safflower oil, or combinations thereof.

7. The method of claim 2 wherein the acid sensitive surfactant is selected from the group consisting of soya diethanolamide, $C_{20}$–$C_{24}$ alkyl glucosides, polyetheralkylpolymethyl siloxane or combinations thereof.

8. The method of claim 1 wherein the oleaginous fluid comprises from about 30% to about 99% by volume of the invert drilling mud.

9. The method of claim 1 wherein the oleaginous fluid is selected from diesel oil, mineral oil, a synthetic oil or combinations thereof.

10. The method of claim 1 wherein said oleaginous fluid comprises from about 5% to about 100% by volume of a material selected from ester, ethers, acetals, dialkylcarbonates, hydrocarbons, and combinations thereof.

11. The method of claim 1 wherein the non-oleaginous fluid comprises from about 1% to about 70% by volume of the invert drilling mud.

12. The method of claim 1 wherein the non-oleaginous fluid is selected from sea water, brine containing organic or inorganic dissolved salts, a liquid containing water-miscible organic compounds or combinations thereof.

13. The method of claim 1 wherein the washing fluid further includes a surfactant, the surfactant being selected so that it does not interfere with the functional activity of the acid sensitive surfactant.

14. The method of claim 13 wherein the surfactant utilized in the washing fluid is compatible and non-reactive with the acid, the oleaginous fluid and the acid sensitive surfactant.

15. A method of drilling and cleaning-up a wellbore drilled with a invert emulsion drilling mud, the wellbore having a filter cake about its periphery, the method comprising:

formulating the invert emulsion drilling mud, so as to include an oleaginous fluid, a non-oleaginous fluid, an acid sensitive surfactant, and oil-wet solids, said acid sensitive surfactant being selected so that upon addition of acid the invert emulsion is broken;

washing the filter cake with a first washing fluid, said first washing fluid including oleaginous liquid and surfactant; and said washing fluid being in sufficient quantities to substantially remove the invert emulsion drilling mud from the wellbore;

washing the filter cake with a second washing fluid, said second washing fluid including water, surfactant and an acid, said acid having been selected so as to react with the acid sensitive surfactant so as to make the oil-wet solids of the filter cake water-wet, and;

removing the filter cake from the wellbore by washing the wellbore with aqueous fluid.

16. The method of claim 15 wherein the acid sensitive surfactant is selected from acid hydrolyzable, mixed alkyldiethanol amides, alkyl glucosides, polyalkylglucosides, alkylalkoxypolydimethylsiloxanes, polyalkyldimethylsiloxanes or combinations thereof.

17. The method of claim 16 wherein the acid sensitive surfactant is the reaction product of a mixed alkyl acid and diethanol amine, said mixed alkyl acid having at least 40% by weight of linoleic acid.

18. The method of claim 16 wherein the acid sensitive surfactant is the reaction product of a mixed alkyl acid and diethanol amine, said mixed alkyl acid having at least 40% by weight linoleic acid and less than 35% by weight of oleic acid.

19. The method of claim 16 wherein the acid sensitive surfactant is a reaction product of the transamidification of a mixed alkyl acid ester and diethanol amine, said mixed alkyl acid ester having at least 40% by weight linoleic acid and less than 35% by weight of oleic acid.

20. The method of claim 16 wherein the acid sensitive surfactant is a reaction product of the transamidification of diethanol amine and soya oil, sunflower oil, corn oil safflower oil or combinations thereof.

21. The method of claim 20 wherein the oleaginous fluid comprises from about 30% to about 99% by volume of the invert drilling mud.

22. The method of claim 21 wherein the oleaginous fluid is selected from diesel oil, mineral oil, a synthetic oil or combinations thereof.

23. The method of claim 15 wherein said oleaginous fluid comprises from about 5% to about 100% by volume of a material selected from ester, ethers, acetals, dialkylcarbonates, hydrocarbons, and combination thereof.

24. The method of claim 23 wherein the non-oleaginous fluid comprises from about 1% to about 70% by volume of the invert drilling mud.

25. The method of claim 24 wherein the non-oleaginous fluid is selected from sea water, brine containing organic or inorganic dissolved salts, a liquid containing water-miscible organic compounds or combinations thereof.

26. The method of claim 15 wherein the surfactant utilized in the first and second washing fluids does not interfere with the performance of the acid sensitive surfactant.

27. The method of claim 26 wherein the surfactant utilized in the first and second washing fluids are compatible and non-reactive with the acid, the oleaginous fluid and the acid sensitive surfactant.

* * * * *

UNITED STATES PATENT AND TRADEMARK OFFICE
CERTIFICATE OF CORRECTION

PATENT NO. : 5,888,944
DATED : March 30, 1999
INVENTOR(S) : Arvind D. Patel

It is certified that error appears in the above-identified patent and that said Letters Patent is hereby corrected as shown below:

At Col. 11, line 65, please delete "Theological" and replace it with --rheological--.

Signed and Sealed this

Twentieth Day of July, 1999

Attest:

Q. TODD DICKINSON

Attesting Officer

Acting Commissioner of Patents and Trademarks